April 12, 1927.  1,624,402
F. F. FORSHEE
ELECTRICAL HEATING APPARATUS
Filed Sept. 12, 1925
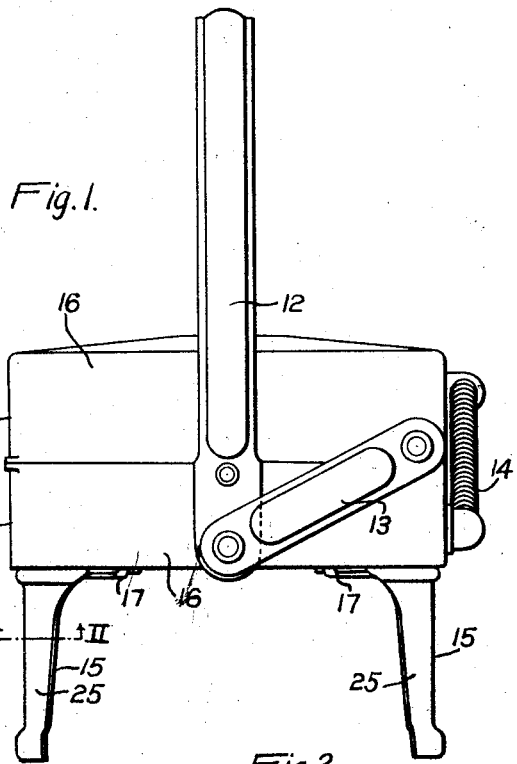
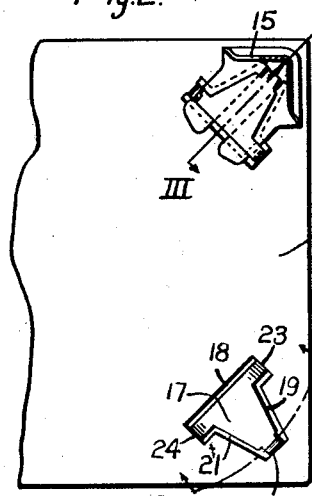
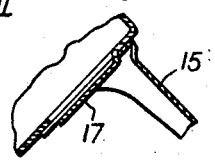
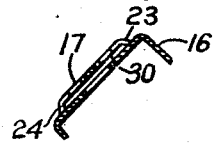
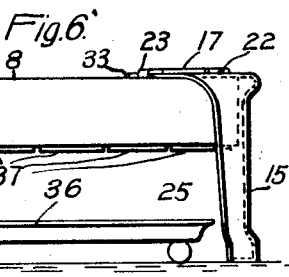
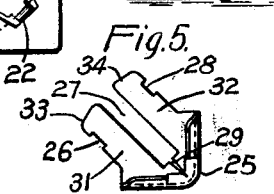
WITNESSES:
INVENTOR
Frank F. Forshee.
BY
ATTORNEY Patented Apr. 12, 1927.

1,624,402

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

ELECTRICAL HEATING APPARATUS.

Application filed September 12, 1925. Serial No. 55,902.

My invention relates to electrical heating apparatus and particularly to means for supporting such apparatus.

One object of my invention is to provide supporting means that are simple in construction, economical in manufacture, and easily attached to the device or apparatus to be supported.

Another object of my invention is to provide supporting means that may be firmly attached to the apparatus to be supported without the aid of additional devices such as bolts, screws or rivets.

Another object of my invention is to provide supporting means for electric heating apparatus that are similar to the legs of a table and which are so reversible as to permit the heating surfaces of such apparatus to be supplied selectively in two positions depending upon the particular application for which the device is used.

In practicing my invention, I provide a casing having substantially rectangular top, bottom and side members. One of the members, preferably the bottom one, has a plurality of depressed portions with openings between said member and each of the depressed portions into which a supporting means, having integral resilient portions, may be so pressed as to form a rigid support for the aforesaid members.

In the accompanying drawings,

Fig. 1 is an end view of a waffle iron embodying my invention;

Fig. 2 is a plan view of a portion of the device illustrated in Fig. 1, showing a horizontal cross-section of the depending member of the supporting device;

Fig. 3 is a view in vertical section, taken on the line III—III of Fig. 2 illustrating the depressed portion of the casing and the supporting device shown in Fig. 1.

Fig. 4 is a view in vertical section taken on the line IV—IV of Fig. 2.

Fig. 5 is a plan view of the supporting means shown in Fig. 1; and

Fig. 6 is an end view of a table stove, embodying my invention.

Referring more particularly to Fig. 1 of the drawings, a waffle iron structure comprises two casing members 10 and 11, a plurality of levers 12 and 13, a hinge 14, and supporting members 15. The pivotally mounted levers 12 and 13 are used to effect relative movement of the upper casing 10 with respect to the lower casing 11. The member 12 also serves as a handle for carrying the waffle iron.

The casing members 10 and 11 are made of flat pieces of metal, such as sheet steel, with the edges bent to form a box-shaped enclosure, having a plurality of sides 16, wherein the heating elements of the waffle iron are contained. The depressed portions 17 of the casing 11 are formed by cutting a plurality of slots 18, 19 and 21 as shown in Fig. 2, and by displacing the intervening metal downward where it is held firmly in position by the integral bridge members 22, 23 and 24.

Each of the supporting members 15, illustrated in Fig. 1, is of thin metal which is suitable to be pressed into a desirable shape or form. The member 15 comprises a leg portion 25 and bifurcated members 31 and 32 integral therewith and having recesses 26, 27, 28 and 29 respectively, therein. The member 15 is preferably made by a stamping and pressing action and the depending portion 25 is substantially of V shape in cross-section and at right angles with members 31 and 32 for engaging the body of the device to be supported.

The length of the depending portion 25 of the supporting member 15 may be varied to meet the requirements of the particular apparatus with which it may be employed. Likewise, the thickness or the gage of metal used will be determined by the weight of the body or device to be supported. The laterally extending members 31 and 32 may be large enough to insure ample bearing area and rigidity. The V-shape recess 29 permits the members 31 and 32 to approach each other in order that the recesses 26, 27 and 28 may register with the bridges 22, 23 and 24, respectively, when the supporting device 15 is in its operative position. The ends 33 and 34 of the members 31 and 32 are so bevelled as to cause the V-shape recess 29 to close as the members 31 and 32 are pressed between the depressed portion 17 and the bottom member 16 of the casing 11.

Referring to Fig. 6, a table stove structure comprises a casing 35 supported by members 15. A tray 36, in which steaks or other kinds of meat may be broiled, is disposed under the table stove to be in the path of the heat rays directed downwardly from the heating elements 37. If it is desired to use the table stove for frying or cooking purposes other than for broiling, the legs or supporting members 15 may be removed, the casing 35 so inverted that the heating elements 37 will occupy the position previously held by the surface 8 but with the members 15 remaining in the same relative position as illustrated in Figures 1 and 6.

My improved support may be attached to devices other than those shown in the drawings without the aid of additional parts such as screws, bolts or rivets so as to form a rigid support, as the resilient bifurcated members cause the recesses to register firmly with bridges, by reason of the spring action of the aforesaid resilient laterally extending members, thereby eliminating the necessity for such additional parts.

Various other modifications and changes may be made without departing from the spirit and scope of my invention as set forth in the appended claims.

I claim as my invention:

1. In combination, a casing having a plurality of depressed portions each connected thereto by a plurality of bridges integral therewith, and a casing-supporting device having a plurality of resilient members integral therewith which is firmly held between the depressed portions by reason of the resiliency of the members.

2. In combination, a casing having a depressed portion connected thereto by a plurality of bridges, and casing-supporting means having a depending member and a pair of resilient members with recesses therein extending laterally from one end thereof.

3. In combination, a casing having depressed portions connected thereto by a plurality of bridges integral therewith, and casing-supporting means comprising a plurality of resilient members, with recesses therein, extending between the depressed portions and the casing so as to cause the recesses to register with the bridges by reason of the spring action of the resilient members.

4. In combination, a casing having a depressed portion connected to the casing by a plurality of bridges integral therewith, and casing-supporting means comprising a pair of resilient integral members with a plurality of recesses therein, extending between the depressed portion and the casing and firmly interlocked therewith by reason of the bridges and the recesses in the resilient members.

5. In combination, a casing having depressed portions connected thereto by a plurality of bridges and casing-supporting means comprising a depending portion and a plurality of resilient members extending laterally from one end thereof and firmly held between the depressed portions and the casing by reason of the interlocking of the resilient members and the aforesaid bridges.

6. In combination, a casing having depressed portions attached thereto each with openings therebetween and casing supporting means frictionally and resiliently held between the depressed portions and the casing, and adapted to be so reversible as to cause the casing to be selectively supported in a plurality of positions.

In testimony whereof, I have hereunto subscribed my name this 2 day of Sept. 1925.

FRANK F. FORSHEE.